Aug. 23, 1938.　　　W. M. RYAN ET AL　　　2,127,964
CAPPING AND SEALING APPARATUS
Filed Jan. 3, 1935　　　4 Sheets—Sheet 1

INVENTORS
WILLIAM MILES RYAN
JOHN W. BOLD
BY
THEIR ATTORNEYS

Patented Aug. 23, 1938

2,127,964

UNITED STATES PATENT OFFICE 2,127,964

CAPPING AND SEALING APPARATUS

William Miles Ryan and John W. Bold, Brooklyn, N. Y., assignors to Ryan Coffee Corporation, Brooklyn, N. Y., a corporation of New York Application January 3, 1935, Serial No. 194

27 Claims. (Cl. 226—68)

Our invention relates to apparatus for sealing various products in containers or cans under a vacuum or a selected gas atmosphere, and more particularly to apparatus in which covers are placed on the containers or cans while the latter are subjected to vacuum or gas.

Heretofore when containers or cans filled with material, whether liquid or a granular or solid powder, have been sealed under vacuum or a selected gas atmosphere, a cover has been loosely placed on the can or container before the vacuum or gas treatment. The can or container with the loosely applied cover has then been subjected to the vacuum and, if sealing under a selected gas is desired, then to the selected gas atmosphere. When the can or container is subjected to vacuum the gas dissolved in the liquid or absorbed in the solid mass tends to expand and flow out from the container. The cover interferes with the escape of this gas, confining it to a narrow passage between the cover and the can or container, thus increasing the difficulty of withdrawing air from the can.

The loosely applied cover also obstructs the flow of selected gas into the container to replace the air withdrawn and, should it become sucked down tightly onto the container edge, might prevent the selected gas from entering the can in the brief period before the cover is sealed permanently onto the can or container.

An object of our present invention is to provide an apparatus whereby the filled cans or containers may be fed into a sealing room maintained under a vacuum or pressure and in which the covers may be independently supplied to the room and placed individually on the individual cans prior to the sealing of the latter.

The various features of the invention are illustrated in the accompanying drawings, in which—

In the accompanying drawings the invention is illustrated by way of example as applied to apparatus for supplying cans or containers to a sealing room and removing the sealed cans as described in our co-pending application Patent #2,094,754, but it will be understood that it may be used with other apparatus for supplying cans or containers to, and removing them from, a room in which they are capped and sealed under vacuum or under a selected gaseous atmosphere.

In the apparatus illustrated in the drawings a number of cans or containers are grouped and enclosed in a chamber in which they are gradually brought to the vacuum prevailing in the sealing chamber, when the containers are to be sealed under vacuum and are surrounded with the selected gas when the containers are to be sealed under gas. The cans or containers are then supplied to the sealing room which contains a capping machine, and are then fed individually to the capping machine in which a cap is sealed in place. The sealed cans are then removed through a chamber in which they are grouped and from which the gas is withdrawn, in those cases in which the cans or containers are sealed under gas, and air is admitted and the cans discharged. It will be understood that the capping machine may be of any suitable type.

In the present invention, covers are supplied to the sealing room preferably in small groups or stacks. These small stacks of covers are first moved into an antechamber or pre-vacuum chamber which is then closed and the air withdrawn until the vacuum prevailing in the sealing room is attained or, if gas is used in the sealing room, gas is then admitted so that the entrance chamber for the covers is at substantially the same atmospheric or gaseous condition as the sealing room. The pre-vacuum or entrance chamber is then opened to the sealing room and the covers, or stacks of covers, contained therein are moved into the sealing room, and stacked therein in position to be fed to the containers. From the stack of covers thus formed in the sealing room the covers are fed individually and in synchronism with the feeding of individual containers to the capping or sealing machine and are placed upon the open ends of their respective containers. The feeding of the covers to and through the entrance chamber and the opening and closing, evacuation and filling of this chamber, and the transfer of the covers to the sealing room are all accomplished in timed relation or sequence by a timing mechanism independent of the means for feeding containers to the sealing room. This cover feeding mechanism is placed in operation automatically by a detector mechanism when the stacked containers within the sealing room fall below a predetermined minimum level or supply.

Figures 1, 2:
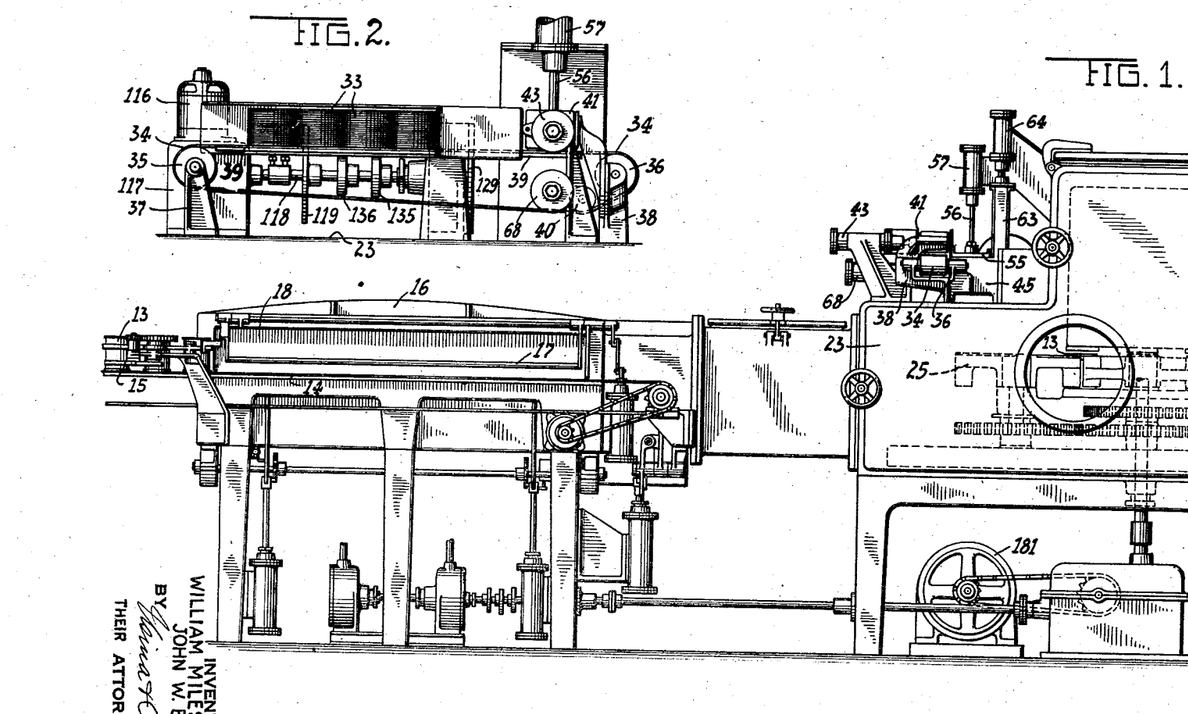
Fig. 1 is a side elevation of a conveying and sealing apparatus and a cover feed mechanism embodying our invention.
Fig. 2 is a partial front elevation of the cover feed mechanism.
Figure 3:
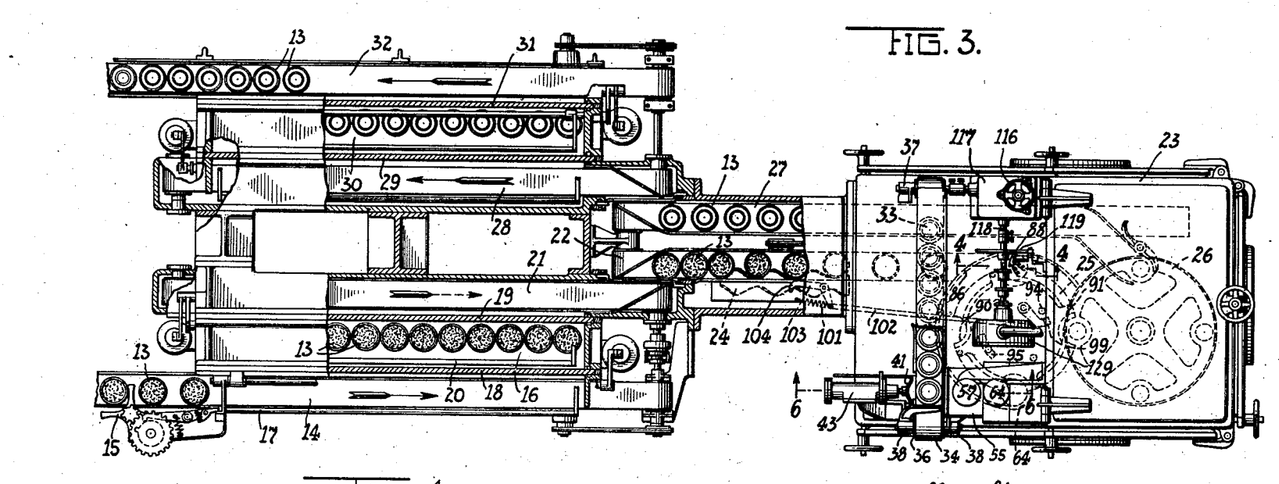
Fig. 3 is a plan view, partly in section, of the apparatus of Fig. 1.

Referring more particularly to Figs. 1 and 3 of the drawings, filled containers are fed in succession on a belt conveyor 14 through a suitable grouping turnstile 15 as described in said Patent #2,094,754, and are grouped in front of a pre-vacuum or entrance chamber 16 into which they are pushed by a pusher 17. The entrance to the chamber 16 is then closed by a door or gate 18 and the chamber subjected to vacuum and, if the sealing or capping is to take place under a selected gas atmosphere, a quantity of this selected gas is admitted to the chamber 16. Thereafter a door or gate 19 at the opposite side of the chamber 16 is opened and the cans 13 are pushed by a pusher 20 onto a conveyor belt 21. The gate 19 is then closed, whereupon the chamber 16 will be filled with atmospheric air after withdrawing the selected gas, if the containers are sealed in a selected gas, and the gate 18 opened to receive a new supply of containers.

The belt conveyor 21 conveys the containers onto a second conveyor 22 from which the cans or containers are fed into a sealing room 23. As the containers are supplied to the sealing room 23 they are separated by means of a screw 24 and then passed individually to a rotating plate or turret 25 which carries them to the capping machine 26. From the latter the capped cans are conveyed to a belt 27 and thence to a second belt 28, from whence they are fed through a gate 29 to an outlet chamber 30 which is then closed and the selected gas is withdrawn, if the apparatus is used under a selected gas atmosphere, and to which atmospheric air is then admitted. Thereafter the capped cans are passed through an outer gate 31 to a conveyor 32 which removes them to storage.

The above apparatus is shown and described in greater detail in the above referred to Patent #2,094,754 and is herein outlined only briefly as an example of a suitable apparatus for transferring containers to the sealing room.

The covers 33 to be supplied to the cans or containers within the sealing room are placed, manually or otherwise, on a belt conveyor 34 (Figs. 2 and 6) preferably positioned immediately above the sealing chamber 23. The belt conveyor is supported between a pair of pulleys 35 and 36 mounted respectively in standards 37 and 38 on the top of the chamber 23. The weight of the covers is supported on a platform 39 over which the upper length of the belt conveyor moves. The belt conveyor may also be provided with an idler 40 when desired. The conveyor is driven intermittently through a control means to bring a group or stack of covers into position in front of a pushed or transfer mechanism which pushes the stack sidewise from the belt into an ante-chamber or pre-vacuum chamber which is to be brought to the same atmospheric content as the sealing room atmospheric content, that is, vacuum or selected gas, prior to transfer to the sealing chamber itself. This pusher or transfer mechanism comprises a plate 41, preferably curved to fit the edges of the stack of covers, and supported on a piston rod 42 which reciprocates in a pneumatically operated cylinder 43, Figs. 6 and 7.

Figures 6, 7, 8, 9, 10:
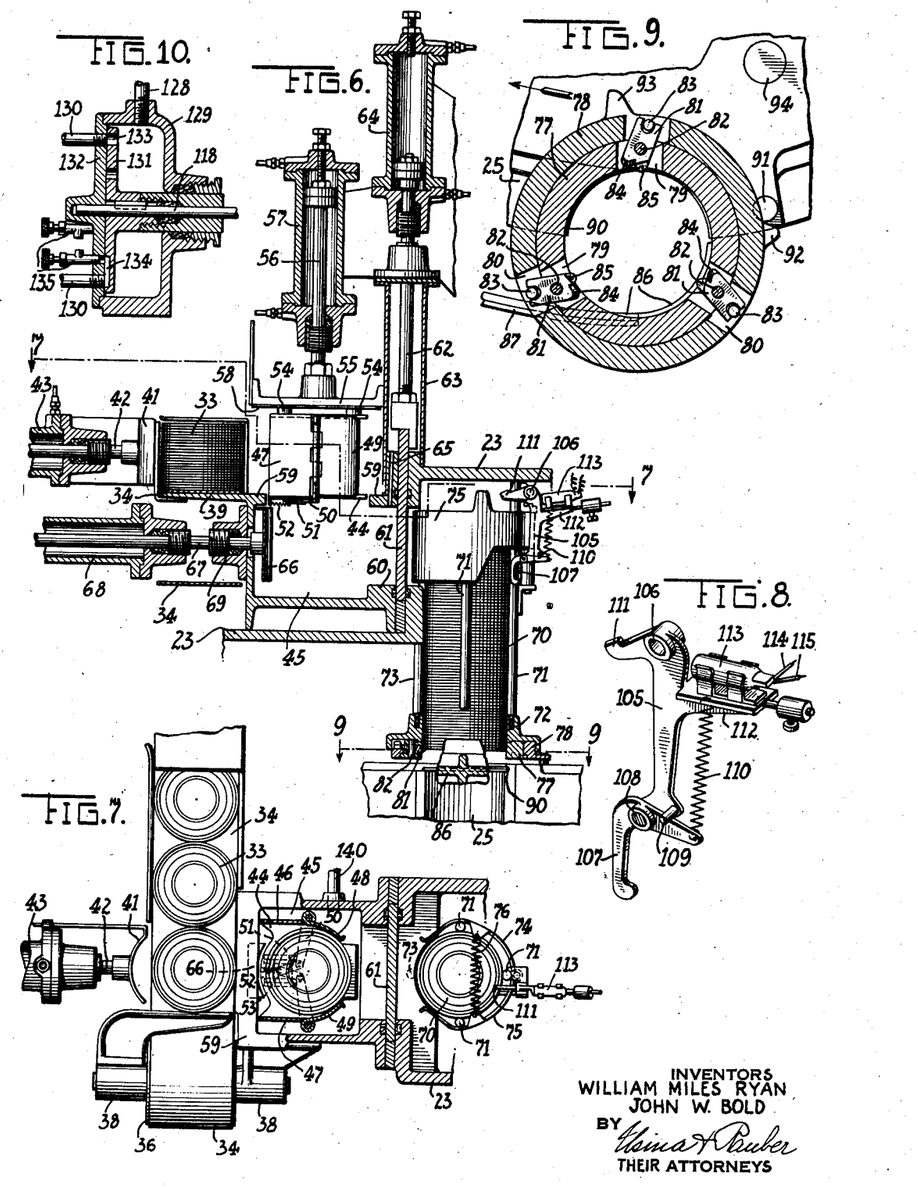
Fig. 6 is a sectional side elevation of part of the cover transfer mechanism on line 6—6, Fig. 3.
Fig. 7 is a horizontal section of the same on line 7—7, Fig. 6.
Fig. 8 is a perspective view of mechanism to control the size of a stack of covers inside the sealing room.
Fig. 9 is a sectional plan view of a single cover release mechanism on line 9—9, Fig. 6.
Fig. 10 is a sectional side view of a pneumatic valve control.

At the proper timed interval pressure fluid is admitted to the cylinder 43 to push the plate 41 to the right of Figs. 6 and 7 and thus to push the stack of covers 33 sidewise from the belt 34 onto a platform 44 immediately above a chamber 45. Thereupon the plate 41 is withdrawn to its original position by a reversal of the valve connections of the cylinder 43 and to permit a second stack of covers 33 to be brought into position in front of the pusher plate 41. The stack of covers 33 moving onto the platform 44 is guided by a pair of fixed plates 46 and 47, one at each side of the stack. The stack is also guarded against undue displacement in advance of the plate 41 by a pair of plates 48 and 49 hinged to the edges of the plates 46 and 47 and resiliently held against the edges of the stack by means of levers 50, links 51 and a spring 52. The ends of the levers are guided by rails 53. The movement of the plates 48 and 49 under the action of the spring 52 is limited by the edge of the platform which prevents the spring 52 from forcing the plates 48 and 49 and the stack of covers 33 from the platform 44. The platform 44 is suspended from the side plates 46 and 47 which are integral with a top plate secured by pillars 54 to a cover plate 55 which, in turn, is secured to a piston rod 56 extending upwardly into a fluid pressure cylinder 57. After the stack of covers has been transferred to the platform 44 as described above, fluid pressure is admitted in timed sequence to the upper end of the cylinder 57 and exhausted from the lower end to permit the piston rod 56 and with it the cover plate 55 and platform 44 to descend. The lower edge or surface of the cover plate 55 is provided with a gasket 58 of resilient material such as rubber or other composition.

As the cover plate 55 is lowered, the gasket 58 contacts with the upper surface 59 of the ante-chamber 45 which is provided with a suitable opening through which the platform 44 and its load of covers descend. When the cover plate 55 rests on the surface 59, the platform 44 is approximately at or slightly above the threshold 60 of an opening from the chamber 45 into the interior of the sealing room 23. The opening between the ante-chamber 45 and the sealing room is at this time closed air tight by means of a gate 61. The upper opening of the ante-chamber is also closed by the cover plate 55, being sealed in air tight connection by the gasket 58 and by pressure applied to it from the upper end of the cylinder 57. While the chamber is thus sealed from the atmosphere, air is withdrawn from it until it reaches approximately or substantially the vacuum within the sealing room; or, if the sealing room is maintained under a selected gas, a high vacuum is first attained in the chamber 45 and then the selected gas is admitted to substantially the same pressure as that within the sealing room. When the atmospheric content within the ante-chamber 45 is equalized to that of the sealing room 23, the gate 61 is lifted by means of a piston rod 62 to which it is connected within a narrow chamber 63 and which, in turn, extends into a fluid pressure cylinder 64 to the lower end of which fluid under pressure may be admitted to lift the piston rod and gate.

In order to enable the gate 61 to be readily lifted, the chamber or chamber extension 63 is placed in communication with the chamber 45 through a passage 65 thereby equalizing the pressure on the upper and lower edges of the gate 61.

When the gate 61 has thus been lifted and the ante-chamber 45 put into communication with the chamber 23, the covers are pushed over the threshold 60 and into the chamber 23 by means of a pusher plate 66 mounted on the end of a piston rod 67 working in a pneumatic or pressure fluid cylinder 68. The surface of the plate 66 is preferably curved to approximately the curvature of the edges of the covers so as to position them more accurately. The piston rod 67 preferably passes through a suitable stuffing box 69 in order to prevent escape of fluid or entrance of air from or to the chamber 45. Upon the admission of pressure fluid to the left hand end of the cylinder 68, the piston rod 67 and plate 66 move toward the right of Figs. 6 and 7 to push the covers past the plates 48 and 49 which yield and open under the force of the piston rod, and thence onto a stack or pile of covers 70 within the chamber 23. The plate 66 and piston 67 then withdraw to their original position as shown in Fig. 6, and the gate 61 is lowered by reversal of the pressure fluid in the cylinder 64. Thereupon, if the apparatus is operated under a selected gas, this gas is withdrawn and retrieved, thereby again creating a vacuum within the chamber 45. This vacuum is then broken by the admission of air under suitable control mechanism.

When the pressures within and outside the ante-chamber 45 have been equalized, the cover plate 55 is lifted by the piston rod 56 and thus restored to its original position as shown in Fig. 6. While the cycle of operation has been described as starting from the position shown in Fig. 6, it will be understood that it may start and stop at other positions and, preferably, start with a supply of covers within the chamber 45 and end at this point of the cycle so that when the level of the stack of covers 70 drops to the level of the threshold 60, the new supply of covers will be immediately supplied from the chamber 45 before the level of the stack 70 has decreased substantially below the level of the threshold 60. Otherwise, if the feeding of covers from the chamber 45 to the stack 70 is delayed for too long a time, the level of the stack 70 might drop too far below the level of the threshold 60 and cause the new stack to drop as it is fed into the stack 70.

It will be understood that the above cycle of operations takes place each time that the top cover of the stack 70 falls below a predetermined level, for example, the level of the threshold 60. This ensures an ample supply of covers within the chamber 23 to ensure that each container will be supplied with a cover as it passes to the capping machine.

Suitable means are provided for maintaining the stack 70 in vertical position and with the edges of the covers in accurate alignment. For this purpose a number of pillars 71 are mounted in a ring 72 enclosing the lower end of the stack 70, there being three such pillars extending up to the full heighth of the stack and an additional pillar 73 extending from the ring 72 to the threshold 60. The portion of the stack 70 above the level of the threshold 60 is also held in position by means of a pair of curved plates 74 and 75 hinged at their edges farthest from the opening between the ante-chamber and the sealing room and resiliently drawn together by means of a spring 76. The mounting of the plates 74 and 75 is such that they yield against the action of the spring 76 when a supply of covers is pushed onto the stack 70 and then close against the pillars 71, as shown in Fig. 7, to enclose the covers lightly so as to permit them to fall freely in the stack.

The covers are withdrawn individually from the bottom of the stack by any suitable mechanism and supplied in properly timed sequence to the cans or containers to be sealed. A mechanism for this purpose is shown in Fig. 9 taken in conjunction with the broken line mechanism of Fig. 3.

This mechanism comprises a ring 77, the inner periphery of which is just sufficient to permit the stack of covers to fall freely therethrough. The ring 77 is fixed and is encircled by a second ring 78 which is capable of limited rotation or oscillation. Radially positioned openings 79 and 80, three being shown by way of example, are provided in the rings 77 and 78 respectively. Cover feeding escapement levers 81 are mounted, one at each opening 79, on a respective pivot pin or trunnion 82 therein. The outer ends of the levers 81 are bifurcated and receive a respective pin 83 in the opening 80 of the ring 78 so that each of the levers is rocked as the ring 78 oscillates in one direction or the other. The inner ends of the levers 81 are provided with feeding teeth 84 and 85, one being positioned to swing within the inner periphery of the ring 77 as its lever is rocked in one direction, and the other to swing within the periphery of the ring 77 when the lever is rocked in the opposite direction. The teeth 84 and 85 are spaced vertically the width or thickness of a cover. Consequently, when one tooth 84, for example, swings out of the periphery, the stack of covers drops the thickness of one cover and rests on the tooth 85 and, upon the reverse rocking of the lever, the tooth 84 engages the stack immediately above the bottom cover which is released from the tooth 85.

The released cover then drops through the ring 77 onto rails or a platform 86 having a circular guide 87. The platform 86 extends to a position above the path of the cans being fed to the capping machine 26 and the covers are moved along the rails or platform 86 to a position to drop onto the cans in synchronism with the movements of the cans. This is a known feature of capping machines and is, therefore, not shown in detail in the accompanying drawings it be apparent, for example, that the rails 86 may extend to the position indicated at 88 in Fig. 3 of the drawings. The covers released from the stack 70 onto the rails or platform 86 are conveyed on the latter by means of the rotating plate or turret 25 (Figs. 9 and 3) having semi-circular notches 90 to permit the released covers to drop onto the rails 86 and then to engage these covers and slide them on the rails until they drop onto their respective cans or containers. The rotating disc or turret 25 also serves to give the ring 78 its rocking or oscillating motion. For this purpose a peg or stud 94 is mounted on the disc or turret 25 in position to engage a projection 93 on the ring 78 so as to give the latter a short counter-clockwise rotation. Thereupon a cam-like projection 92 on the outer surface of the ring 78 is brought into position to be engaged by a peg 91 on the disc or turret 25 so as to oscillate the ring 78 reversely to its original position. There is one of each of the pegs 91 and 94 for each of the recesses 90 so that each time the recess 90 comes into position to receive a cover, the ring 78 will have been given a proportionate oscillation to release a cover.

Figure 5:
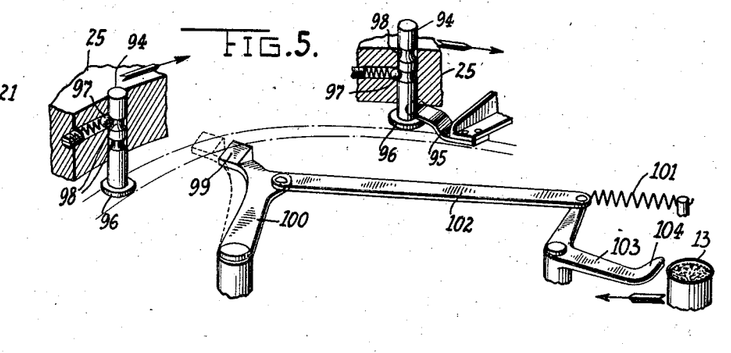
Fig. 5 is a perspective view, partly in section, of mechanism to control the supply of covers and prevent feeding a cover when a container is missing.

Means are also provided to prevent feeding a cover in case the supply of cans or containers should be interrupted or in case a can should be missing from its appropriate sequence. For this purpose the mechanism shown in Figs. 5 and 3 is provided to keep the peg or stud 94 out of operative position upon the failure of a can. For this purpose the peg 94 is slidably mounted in the plate 25 so that it may rise in position to engage the cam projection 93 or be lowered out of engaging position. For this purpose a stationary cam 95 is mounted immediately below the rotating disc 25 in position to engage a cap or plate 96 on the lower end of the stud 94 and lower it until its upper surface is substantially flush with the upper surface of the disc 25. The stud 94 is held in this lowered position by means of a spring pressed ball 97 in the plate 25 which engages an annular recess or groove 98, the position of the withdrawn stud being that indicated at the left of Fig. 5. In this position it would not engage the projecting cam 93 and a cover feeding oscillation would not be given to the escapement levers 81. To restore the stud 94 to operative position, a lifting cam 99 is provided on the end of a horizontal lever 100 which may swing from the position shown in full lines in Fig. 5 to that shown in dotted lines and, in the latter position, causes the stud 94 to rise to engaging position.

The lever 100 is normally drawn to non-engaging position by means of a spring 101 to which it is connected by a link 102. It is swung to operative position against the tension of the spring 101 by a bell crank lever 103 which is so positioned that a foot 104 at one end is engaged by a can 13 as the latter is fed by the screw 24 toward the capping machine (Fig. 3). It will be understood that the relation between the position of the recesses and the actuating can or container is such that a cover dropped into the recess 90 by any particular can 13 will meet and be delivered to the can when the latter reaches the position 88. That is, for example, in Fig. 3, there will be one can at the position 88 and three cans between 88 and the can engaging lever 103.

The above specific type of cover feed and control is only one of several known mechanisms that may be used for this purpose and it is given merely by way of example.

The invention provides a mechanism that supplies additional covers to the stack 70 when the height of this stack falls below a predetermined level. This mechanism then goes through a cycle of operations to build the stack up above the minimum level. The cover feed mechanism is controlled and set in motion by means of a feeling lever or finger 105 pivoted at 106, as shown in Figs. 6 and 8, near the upper end of the stack 70. The lever 105 is so weighted that it tends to swing in toward the stack 70 until a pivoted contact member 107 rests against the surface of the stack. The member 107 is pivoted at 108 to the lower end of the lever 105 and one arm is held tightly against a peg 109 by means of a spring 110.

When the top cover of the stack falls below the lower end of the lever 107, the lever 105, carrying with it the lever 107, swings inwardly until a stop 111 on the upper end of the lever 105 bears against the top wall 23 of the sealing room. A bracket 112 projecting from the side of the lever 105 carries a mercury switch 113 and as the lever 105 swings inwardly above the stack 70, the mercury switch 113 is tilted to close contact between a pair of conducting wires 114 and 115 through which the feeding of additional covers is actuated. When a supply of covers has been fed onto the stack 70, the lever 105 and the depending member 107 are pushed back by the newly added covers to their original position, thereby tilting the mercury switch 113 to break the circuit between the conductors 114 and 115 and interrupt the repetition of a cover feeding cycle.

The pivoted mounting of the member 107 on the lever 105 enables the lever 105 to be swung backwardly free of the stack even though the lower end of the member 107 should rest on or contact with the upper surface of the stack for, in the latter case, the member 107 will tilt in a clockwise direction on its pivot 108 against the tension of the spring 110 until it clears the stack. Moreover, as the stack may be lifted slightly by the action of the escapement 81, the member 107 can swing clockwise and yield under the slight lifting of the stack occasioned in this manner.

When a circuit is closed by the switch 113 through the conductors 114 and 115, current flows through the conductors 114 and 115 and through a motor 116, Figs. 2, 3, 11 and 12, that drives and controls the feeding of covers to the sealing room. The motor 116 drives the pulley 35 and the belt 34 through a gear box 117 indicated diagrammatically in Fig. 2, and also through this gear box drives a control shaft 118.

Figure 4:
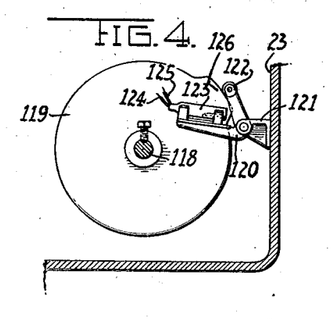
Fig. 4 is a detail elevation, from line 4—4 of Fig. 3, of a time-controlled electric switch mechanism forming part of the apparatus.
Figure 11:
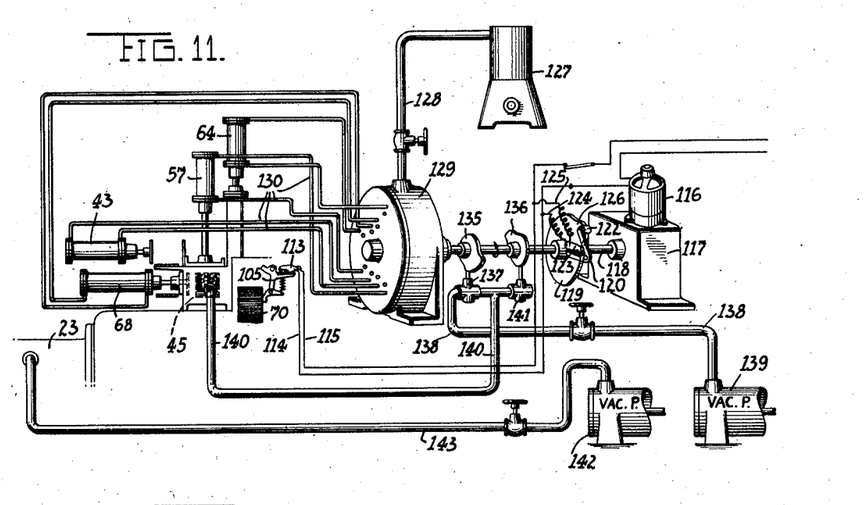
Fig. 11 is a diagrammatic view of the pneumatic and electrical control mechanism of the cover feed device as used on a machine in which the product is to be vacuumized or sealed under reduced pressure.

In the apparatus for use in vacuum sealing, as shown in Fig. 11, a cam 119 is mounted on the shaft 118 and controls a circuit by-passing the switch 113. A bell crank lever 120, Fig. 4, is mounted on a bracket 121 on a wall of the sealing room and at one end has a contact roller 122 that engages the circumference of the cam 119. The other arm of the bell crank lever carries a mercury switch 123 connected through branch wires 124 and 125, respectively, with the conductor wires 114 and 115.

The circumference of the cam 119 extends upwardly in a protuberance 126 so positioned that at the starting position of the motor this protuberance engages the roller 122 and tilts the lever 120 to the position shown in Fig. 4 in which the wires 124 and 125 are disconnected. As the motor starts, however, the roller 122 rides off the protuberance 126 and the lever 120 swings downwardly, connecting the wires 124 and 125 and thus by-passing the switch 113 so that the motor 116 is in closed circuit and rotates until the cam 119 returns to its original position and interrupts the circuits 124 and 125. A complete revolution of the cam 119 corresponds to a complete cycle of cover feed to the stack 70. If the switch 113 still remains closed when the cycle is completed, the motor remains in closed circuit and a new cycle immediately follows. If, however, the switch 113 has been moved to open position, the motor stops when the circuit is broken through the switch 123 and remains stationary until the switch 113 is again closed.

The shaft 118 also carries control mechanisms for controlling the supply of pressure fluid to the cylinders 57, 64, 43, 68 for transferring the covers through the chamber 45 into the sealing room and for opening and closing the valves between the chamber 45 and the outside atmosphere and the room respectively. Any suitable mechanism may be employed for distributing the pressure fluid from any suitable source, such as the compressor 127, through a supply pipe 128 to branch pipes leading to the respective cylinders. A rotary valve 129 such as shown in our co-pending application Serial No. 709,198 is preferred.

The fluid pressure is supplied to the interior of the rotary control mechanism 129 through the pipe 128 and is then distributed to, and exhausted from, the cylinders 43, 68, 57 and 64 through connecting pipes 130 at the proper intervals.

The distribution of the pressure fluid to and from the pipes 130 is accomplished by a rotating plate or rotor 131, Fig. 10, keyed onto the shaft 118 and resting against a flat surface 132 of the chamber 129 in which the pipes 130 terminate. Pressure fluid is admitted to the pipes 130 through ports 133 in the rotor 131 and is exhausted from the pipes through passages 134 leading to exhaust outlets 135. With each rotation of the shaft 118 there is, therefore, a cycle of interrelated timed actuations of the pistons within the respective cylinders 43, 57, 64 and 68 so that with each rotation of the shaft 118, a stack 33 of covers is transferred through the chamber 45 into the sealing room 23 and onto the stack 70.

The shaft 118 also carries a cam 135 which controls the evacuation or withdrawal of air from the chamber 45 after the cover 55 is lowered and before the gate 61 is raised, and a cam 136 for admitting air to the chamber 45 after the gate 61 has again been closed and before the cover 55 is lifted. Thus, at a certain interval, the cam 135 acts on a valve 137 to open communication in a pipe 138 leading to a vacuum chamber or pump 139 and connected to a pipe 140 leading to the chamber 45.

Thereafter the cam rotates to permit the valve 137 to close and at a proper interval thereafter the cam 136 opens a valve 141, connecting the pipe 140 and, accordingly, the chamber 45 to the atmosphere to permit the entrance of air to the chamber 45. A vacuum is created in the sealing room 23 by means of a vacuum pump 142 connected to the pipe 143.

Figure 12:
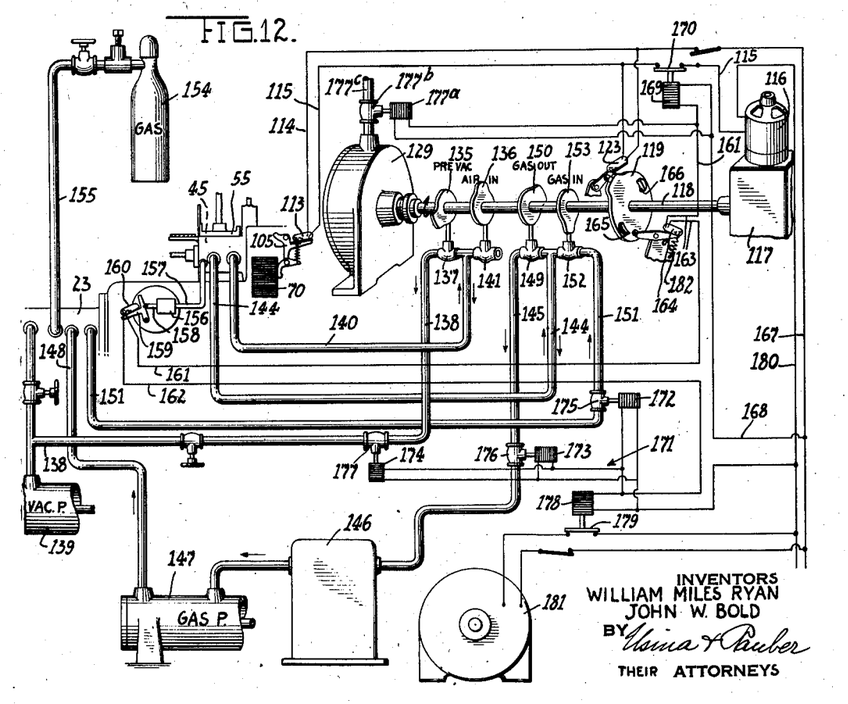
Fig. 12 illustrates a diagrammatic view similar to that of Fig. 11, but in which the product to be packed is not only subjected to vacuumization, but a selected or preservative gas as well.

Fig. 12 illustrates a modification for use when the room 23 is filled with a selected gas. In this arrangement the rotor control 129 and the cams 135 and 136 and the switch 123 are in substantially the same relation to the apparatus previously described as in Fig. 11, although their timing intervals may be different. In addition, however, means are provided to admit the selected gas to the chamber 45 immediately after it has become evacuated until the pressure is equalized with that in the chamber 23, and also to withdraw this gas from the chamber 45 before air is admitted to this chamber and the cover 55 lifted.

The selected gas is admitted and withdrawn to the chamber 45 through a pipe 144 which is connected to a pipe 145 leading through a purifier 146 and a suction pump 147 and thence through a pipe 148 to the sealing room 23.

Passage through the pipe 145 is controlled by a valve 149 operated by a cam 150 on the shaft 118. The pipe 144 also communicates with a pipe 151 leading directly to the chamber 23 through which gas may pass from the chamber 23 through the pipe 144 and 145. Passage through the pipe 151 is controlled by a valve 152 actuated by a cam 153 on the shaft 118, it being understood that the cams 150 and 153 are so set that they will open and close their respective valves 149 and 153 at properly timed intervals, and that one valve will be closed when the other is open. Gas is supplied from a bottle 154, or other source of supply, through a pipe 155 to the chamber 23.

Control means are provided which will stop the apparatus in case a proper vacuum is not formed at the proper time in the chamber 45. Such failure to create a proper vacuum in the chamber 45 may be caused by a number of circumstances as, for example, the failure of the gate 61 or the cover 55 to close tightly. This vacuum control mechanism comprises a vacuum operated mechanism such as a diaphragm or collapsible chamber 156 of any suitable type connected to the chamber 45 through a pipe or tube 157. The chamber 156 is connected through a link 158 with a rocking support 159 for a mercury or other suitable electric switch 160.

When a predetermined vacuum has been created in the chamber 45 and in the chamber 156 it pulls the lever 158 to rock the switch 160 in a position to open the circuit between a pair of control wires 161 and 162. When less than the required vacuum is present in the chamber 45, switch 160 will not be tilted and the circuit between the wires 161 and 162 remains closed.

The conducting wire 161 is connected through branches 163 to a tilting mercury switch 164 which is controlled by cam projections 165 and 166 on the cam 119. The arrangement of the cams 165 and 166 is such as to tilt the switch 164 to close the circuit in the conductor 161 at those points in the cycle in which the chamber 45 has been connected to the pipe 138 by the cam 135 and valve 137 or to the pipe 145 by the cam 150 and valve 149 for a sufficient time to have become evacuated or near the end of evacuation of chamber 45. If, upon failure of vacuum the switch 160 remains in closed position, as shown in Fig. 12, current flows from an electric main 167 through a branch wire 168, thence through a solenoid 169, energizing the latter to open a switch 170 in the wire 115 and stop the motor 116.

Thence the current flows through the wire 161 and the closed branches 163 to the conductor 162. From the latter it flows through various branch circuits, indicated collectively at 171, to solenoids 172, 173 and 174, closing the valves 175, 176 and 177 in the pipes 151, 145 and 138, respectively, through which air may be withdrawn from the gas supply to the chamber 45. Also a solenoid 177ª is energized to close the valve 177ᵇ controlling the inlet pipe 177ᶜ to the rotary control valve 129. This prevents the admission of air to the vacuum system through the open chamber 45, or escape of selected gas to the chamber 45 and to atmosphere. At the same time current also flows through the branch system 171 to a solenoid 178 that controls a switch 179 between the mains 167 and 180 to a motor 181 that drives the sealing apparatus and the can feeding apparatus.

Through the above arrangement, therefore, failure to obtain the proper vacuum in the chamber 45 at the proper time will cause the apparatus to stop and the valves to close to prevent waste of gas or destruction of the vacuum.

During other periods in the cycle than those in which the chamber 45 is to be connected to the vacuum system, the switch 164 is tilted to open position by a spring 182 so that the closing of the switch 160 at these times does not close the control circuit.

What we claim is—

1. Apparatus for supplying covers to a sealing mechanism which comprises a sealing room and a capping machine therein, means to maintain said room under other than outside atmospheric conditions, a cover admission chamber opened and closed alternately to atmosphere and to the interior of said room, means to supply covers to said chamber while open to the atmosphere, means to supply covers from said chamber to said room and to stack them therein while open to said room, means to feed covers individually from said stack to said capping machine, means to change the gaseous content of said chamber while closed to atmosphere and to said room, and means actuated by the decrease in said stack of covers below a minimum to control the supply of covers to said chamber and room and the change of gaseous content in said chamber independently of said capping machine.

2. Apparatus for supplying covers to a sealing mechanism which comprises a sealing room and a capping machine therein, means to maintain said room under vacuum, a cover admission chamber open alternately to atmosphere and to the interior of said room, means to supply covers to said chamber when open to the atmosphere, means to withdraw air from said chamber when closed to atmosphere and to said room, means to supply covers from said chamber to a stack within said room when open thereto, means to feed covers individually from said stack to said capping machine, and means actuated by the height of said stack to control said feeding means.

3. Apparatus for supplying covers to a sealing mechanism which comprises a sealing room and a capping machine therein, means to maintain said room under a selected gas atmosphere, a cover admission chamber to open alternately to atmosphere and to the interior of said room, means to supply covers to said chamber when open to the atmosphere, means to withdraw air and to supply a selected gas to said chamber when closed to atmosphere and to said room, means to move said covers from said chamber to a stack within said room when open to said room, and means actuated by the height of said stack to control said cover feeding means to and through said chamber.

4. Apparatus for supplying covers to a sealing mechanism which comprises a sealing room and a capping machine therein, means to maintain said room under a selected gas atmosphere, a cover admission chamber to open alternately to atmosphere and to the interior of said room, means to supply covers to said chamber when open to the atmosphere, means to withdraw air and to supply a selected gas to said chamber when closed to atmosphere and to said room, means to move said covers from said chamber to a stack within said room when open to said room, means actuated by the height of said stack to control said cover feeding means to and through said chamber, and means to stop said mechanism upon failure of vacuum after closing said chamber and before admitting said selected atmosphere thereto.

5. Apparatus for feeding covers which comprises mechanism for feeding and depositing covers on the top of a stack, a lever mounted to swing over said stack and to be pushed back by covers on said stack above a predetermined level, a control circuit closed by said lever to control said mechanism when it swings over said stack, and cover feeding mechanism controlled by said circuit.

6. Apparatus for feeding covers which comprises mechanism for feeding and depositing covers on the top of a stack, a control circuit for said mechanism, a lever mounted to swing over said stack to close said circuit and to be pushed from position above said stack to open said circuit, said lever having a joint permitting it to yield upwardly under pressure from said stack.

7. Cover feeding control mechanism which comprises a motor, a detector lever mounted to rest against the upper part of a stack of covers and to swing to actuating position when said covers fall below the lower end of said detector lever, a circuit including said motor closed by the movement of said lever, a cam rotated by said motor, a switch engaged by said cam to by-pass the circuit about said detector lever when said cam is in other than starting position, and cover feeding mechanism actuated by the rotation of said motor.

8. Means for feeding covers to a sealing room under vacuum which comprises an entrance chamber open alternately to the atmosphere and to said sealing room, an actuating motor, a detector lever to swing above a stack of covers, a circuit through said motor closed by said swinging of said detector lever, a by-pass switch for said circuit, a cam controlled by said motor to close said by-pass switch when moved from starting position, a mechanism driven by said motor to feed covers into said chamber and from said chamber to said room and to open and close said chamber alternately to atmosphere and to the room.

9. Means for feeding covers to a sealing room under vacuum which comprises an entrance chamber open alternately to the atmosphere and to said sealing room, an actuating motor, a detector lever to swing above a stack of covers, a circuit through said motor closed by said swinging of said detector lever, a by-pass switch for said circuit, a cam controlled by said motor to close said by-pass switch when moved from starting position, a mechanism driven by said motor to feed covers into said chamber and from said chamber to said room and to open and close said chamber alternately to atmosphere and to the room, said control means comprising pneumatically operated cylinders, and a rotary control valve for said cylinders driven by said motor.

10. Means for feeding covers to a sealing room under vacuum which comprises an entrance chamber open alternately to the atmosphere and to said sealing room, an actuating motor, a detector lever to swing above a stack of covers, a circuit through said motor closed by said swinging of said detector lever, a by-pass switch for said circuit, a cam controlled by said motor to close said by-pass switch when moved from starting position, a mechanism driven by said motor to feed covers into said chamber and from said chamber to said room and to open and close said chamber alternately to atmosphere and to the room, cams driven by said motor, an air exhausting means, and valves actuated by said cams to connect said chamber to said air exhausting means and to atmosphere alternately.

11. Means for feeding covers to a sealing room under vacuum which comprises an entrance chamber open alternately to the atmosphere and to said sealing room, an actuating motor, a detector lever to swing above a stack of covers, a circuit through said motor closed by said swinging of said detector lever, a by-pass switch for said circuit, a cam controlled by said motor to close said by-pass switch when moved from starting position, a mechanism driven by said motor to feed covers into said chamber and from said chamber to said room and to open and close said chamber alternately to atmosphere and to the room, cams driven by said motor, an air exhausting means, valves actuated by said cams to connect said chamber to said air exhausting means and to atmosphere alternately, circuit controlling means to break said motor actuating circuit and to close said air exhausting means, a switch controlling said circuit, means holding said circuit open except when said chamber is connected to said air exhausting means, and separate means actuated by the vacuum in said chamber to hold said circuit open.

12. Apparatus for feeding covers to a sealing room comprising an entrance chamber opening at one side to said room and at its top to atmosphere, a gate closing said chamber from said room, a closure for the top of said chamber and means to raise said closure and open said chamber to atmosphere, a platform suspended from said closure, means to move said covers onto said platform when said closure is lifted, and means to move said covers into said room when said closure is lowered and said gate is opened.

13. Apparatus for feeding covers to a sealing room comprising an entrance chamber opening at one side to said room and at its top to atmosphere, a gate closing said chamber from said room, a closure for the top of said chamber and means to raise said closure and open said chamber to atmosphere, a platform suspended from said closure, means to move covers onto said platform when said closure is lifted, means to move said covers into said room when said closure is lowered and said gate is opened, and means to hold said covers in stacked position in said room.

14. Apparatus for feeding covers to a sealing room comprising an entrance chamber opening at one side to said room and at its top to atmosphere, a gate closing said chamber from said room, a closure for the top of said chamber and means to raise said closure and open said chamber to atmosphere, a platform suspended from said closure, means to move covers onto said platform when said closure is lifted, means to move said covers into said room when said closure is lowered and said gate is opened, and means to evacuate said chamber between closing of said closure and opening of said gate.

15. Apparatus for feeding container elements to a sealing room which comprises an entrance chamber, means to open and close said entrance chamber to said room and means to open and close said entrance chamber to the atmosphere, means to feed said cover elements to said chamber, means to evacuate said chamber after the closing of said chamber to the atmosphere and before opening it to said room, and means to stop the operation of said apparatus upon failure of vacuum in said entrance chamber.

16. Apparatus of the type described which comprises a sealing room, an entrance chamber opening to said sealing room and opening upwardly to the atmosphere, a horizontal closure for said opening to the atmosphere, a platform suspended from said closure, means to lift said closure to open the entrance to said chamber and to bring said platform to a level to receive articles above said chamber, means to feed articles to a position sidewise of said platform, means to push said articles onto said platform when in raised position, and means to push said articles from said platform into said room when in lowered position.

17. Apparatus of the type described which comprises a sealing room, an entrance chamber opening to said sealing room and opening upwardly to the atmosphere, a horizontal closure for said opening to the atmosphere, a platform suspended from said closure, means to lift said closure to open the entrance to said chamber and to bring said platform to a level to receive articles above said chamber, means to feed articles to a position sidewise of said platform, means to push said articles onto said platform when in raised position, means to push said articles from said platform into said room when in lowered position, a closure between said chamber and said room, means for evacuating said chamber after the upper closure is closed and before said chamber is open to said room, and means for timing the sequence of operation of said various means.

18. Apparatus of the type described which comprises a sealing room, an entrance chamber opening to said sealing room and opening upwardly to the atmosphere, a horizontal closure for said opening to the atmosphere, a platform suspended from said closure, means to lift said closure to open the entrance to said chamber and to bring said platform to a level to receive articles above said chamber, means to feed articles to a position sidewise of said platform, means to push said articles onto said platform when in raised position, means to push said articles from said platform into said room when in lowered position, a closure between said chamber and said room, means for evacuating said chamber after the upper closure is closed and before said chamber is open to said room, and an electric circuit for timing the sequence of operation of said various means, and means controlled by the quantity of articles in said room to start a cycle of operation of said means in timed sequence.

19. Apparatus for feeding covers to a sealing room which comprises an entrance chamber, a gate between said entrance chamber and said room, a chamber communicating with said entrance chamber into which said gate may be withdrawn.

20. Apparatus for feeding covers to a sealing room which comprises an entrance chamber, means for feeding covers to said entrance chamber and from said entrance chamber to said room, means for closing said entrance chamber alternatively to the atmosphere and to said room and means for withdrawing atmospheric air and for withdrawing and retrieving a selected gas during successive periods of closure of said entrance chamber.

21. Apparatus for feeding covers to a sealing room comprising an entrance chamber opening at one side to said room and also opening to the atmosphere, a gate closing said chamber from said room, a vertically movable closure between said chamber and the atmosphere, a cover-receiving platform movable with said closure, means to move covers onto said platform when said vertically movable closure is moved to open position and means to move said covers from said platform into said room when said closure is moved to closed position.

22. Apparatus for feeding covers to a sealing room comprising an entrance chamber opening at one side to said room and also opening to the atmosphere, a gate closing said chamber from said room, a vertically movable closure between said chamber and the atmosphere, a cover-receiving platform movable with said closure, means to move covers onto said platform when said vertically movable closure is moved to open position, means to move said covers from said platform into said room when said closure is moved to closed positions, means to open the closure between said chamber and said room when the closure to the atmosphere is closed and to close said closure when the chamber is open to the atmosphere and means to change the atmosphere in said chamber to correspond to that in said chamber when said room is closed to both said room and the atmosphere.

23. Apparatus for feeding covers to a sealing room which comprises means for maintaining a stack of covers within said room, means controlled by the height of said stack of covers within said room automatically to supply covers to said stack when its height falls below a predetermined level, said means comprising a chamber into which covers are supplied and from which they are supplied to said stack and means for changing the gaseous contents of said chamber when covers are placed therein for transfer to said stack.

24. A method of sealing containers under air free conditions which comprises removing air separately from a group of containers and from a group of closures to produce a selected atmospheric condition under which said containers are to be sealed, introducing said containers and said closures as a group into a common sealing room under air free conditions, placing said closures individually on respective containers in said sealing room and sealing them on their respective containers.

25. A method of sealing a group of containers in an air free gas which comprises replacing air about containers to be sealed with the air free gas, separately replacing air about a group of closures with air free gas, bringing said containers and said closures separately into a common sealing room filled with said air free gas, and separately and individually placing and sealing closures on said containers in said room.

26. Apparatus for closing containers in a selected gas atmosphere which comprises a closure room, means for withdrawing air from containers and closures and introducing them separately in air freed condition into said closure room, means within said room for placing said closures on said containers, and control means controlled by the positioning of a container to receive a closure to permit the operation of said placing means.

27. Apparatus for closing containers under a selected atmosphere which comprises a closure room containing said selected atmosphere, means for withdrawing air from containers and introducing said containers into said room, means independent of said container introducing means for withdrawing air from said closures and introducing them into said room, means for placing said closures in said room on said containers therein, and control means for said positioning means actuated by a container being fed to said positioning means.

WILLIAM MILES RYAN.
JOHN W. BOLD.